(12) United States Patent
Xu et al.

(10) Patent No.: US 9,503,746 B2
(45) Date of Patent: Nov. 22, 2016

(54) DETERMINE REFERENCE MOTION VECTORS

(71) Applicants: Yaowu Xu, Saratoga, CA (US); Paul Gordon Wilkins, Mountain View, CA (US); Adrian Grange, Mountain View, CA (US); James Bankoski, Los Gatos, CA (US)

(72) Inventors: Yaowu Xu, Saratoga, CA (US); Paul Gordon Wilkins, Mountain View, CA (US); Adrian Grange, Mountain View, CA (US); James Bankoski, Los Gatos, CA (US)

(73) Assignee: GOOGLE INC., Mountain View, CA (US)

( * ) Notice: Subject to any disclaimer, the term of this patent is extended or adjusted under 35 U.S.C. 154(b) by 413 days.

(21) Appl. No.: 13/647,076

(22) Filed: Oct. 8, 2012

(65) Prior Publication Data

US 2014/0098877 A1 Apr. 10, 2014

(51) Int. Cl.
*H04N 19/00* (2014.01)
*H04N 19/463* (2014.01)
*H04N 19/52* (2014.01)
*H04N 19/56* (2014.01)
*H04N 19/105* (2014.01)
(Continued)

(52) U.S. Cl.
CPC ............ *H04N 19/463* (2014.11); *H04N 19/52* (2014.11); *H04N 19/105* (2014.11); *H04N 19/154* (2014.11); *H04N 19/56* (2014.11); *H04N 19/61* (2014.11)

(58) Field of Classification Search
CPC ............... H04N 7/50; H04N 7/26244; H04N 7/26271; H04N 7/26015; H04N 7/26031; H04N 19/597; H04N 19/51; H04N 19/593; H04N 19/52; H04N 19/503; H04N 19/00763; H04N 19/513; H04N 7/36; H04N 19/43; H04N 19/00733; H04N 13/00
See application file for complete search history.

(56) References Cited

U.S. PATENT DOCUMENTS 4,924,310 A 5/1990 von Brandt
5,148,269 A 9/1992 de Haan et al.
(Continued)

FOREIGN PATENT DOCUMENTS

EP 0634873 B1 9/1998
EP 0979011 2/2000
(Continued)

OTHER PUBLICATIONS

Peng, Qiang, T. Yang, and C Zhu, Block-based temporal error concealment for video packet using motion vector extrapolation, 2002 International Conference on Communications, Circuits and Systems and West Sino Exposition Proceedings, 10-14 vol. 1:2.
(Continued)

*Primary Examiner* — Jay Patel
*Assistant Examiner* — Frank Huang
(74) *Attorney, Agent, or Firm* — Young Basile Hanlon & MacFarlane, P.C.

(57) ABSTRACT

A method for encoding a video stream having a plurality of blocks including a current block. The method includes identifying, from a plurality of previously coded blocks, a plurality of candidate motion vectors; identifying, for the current block, a set of reconstructed pixel values corresponding to a set of previously coded pixel values; determining, for at least one of the plurality of candidate motion vectors, an error value based on the set of reconstructed pixel values and a set of predicted values for the set of previously coded pixel values; and selecting, from the plurality of candidate motion vectors, a reference motion vector for the current block based on the error value.

18 Claims, 8 Drawing Sheets

(51) Int. Cl.
*H04N 19/61* (2014.01)
*H04N 19/154* (2014.01)

(56) References Cited

U.S. PATENT DOCUMENTS

| | | | |
|---|---|---|---|
| 5,337,086 A | 8/1994 | Fujinami | |
| 5,398,068 A | 3/1995 | Liu et al. | |
| 5,461,708 A | 10/1995 | Kahn | |
| 5,512,952 A | 4/1996 | Iwamura | |
| 5,550,964 A | 8/1996 | Davoust | |
| 5,581,678 A | 12/1996 | Kahn | |
| 5,610,658 A | 3/1997 | Uchida et al. | |
| 5,611,034 A | 3/1997 | Makita | |
| 5,729,690 A | 3/1998 | Jeong et al. | |
| 5,731,840 A | 3/1998 | Kikuchi et al. | |
| 5,742,710 A | 4/1998 | Hsu et al. | |
| 5,886,742 A | 3/1999 | Hibi et al. | |
| 5,905,535 A | 5/1999 | Kerdranvat | |
| 5,978,030 A | 11/1999 | Jung et al. | |
| 5,987,180 A | 11/1999 | Reitmeier | |
| 5,991,447 A | 11/1999 | Eifrig et al. | |
| 6,005,980 A | 12/1999 | Eifrig et al. | |
| 6,011,870 A | 1/2000 | Jeng et al. | |
| 6,014,181 A | 1/2000 | Sun | |
| 6,058,143 A | 5/2000 | Golin | |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,473,460 B1 | 10/2002 | Topper | |
| 6,507,617 B1 | 1/2003 | Karczewicz et al. | |
| 6,711,211 B1 | 3/2004 | Lainema | |
| 6,735,249 B1 | 5/2004 | Karczewicz et al. | |
| 6,876,702 B1 | 4/2005 | Hui et al. | |
| 6,912,255 B2 | 6/2005 | Drezner et al. | |
| 7,002,580 B1 | 2/2006 | Aggala et al. | |
| 7,418,147 B2 | 8/2008 | Kamaci et al. | |
| 7,463,685 B1 | 12/2008 | Haskell et al. | |
| 7,580,456 B2 | 8/2009 | Li et al. | |
| 7,581,168 B2 | 8/2009 | Boon | |
| 7,606,310 B1 | 10/2009 | Ameres et al. | |
| 7,705,847 B2 | 4/2010 | Helfman et al. | |
| 7,978,770 B2 | 7/2011 | Luo et al. | |
| 8,005,144 B2 | 8/2011 | Ji et al. | |
| 8,006,194 B2 | 8/2011 | Berger et al. | |
| 8,130,840 B2 | 3/2012 | Mishima et al. | |
| 8,208,540 B2 | 6/2012 | Cote | |
| 8,345,758 B2 | 1/2013 | Jeon | |
| 8,351,505 B2 | 1/2013 | Jeon | |
| 8,442,117 B2 | 5/2013 | Lee et al. | |
| 8,451,904 B2 | 5/2013 | Reznik | |
| 8,559,512 B2 * | 10/2013 | Paz | 375/240.13 |
| 8,594,200 B2 | 11/2013 | Chang et al. | |
| 8,718,144 B2 | 5/2014 | Reznik et al. | |
| 8,762,441 B2 | 6/2014 | Reznik | |
| 8,787,459 B2 | 7/2014 | Wang | |
| 8,818,114 B2 * | 8/2014 | Kim et al. | 382/232 |
| 8,867,618 B2 | 10/2014 | Pandit et al. | |
| 8,879,634 B2 | 11/2014 | Reznik | |
| 8,885,956 B2 * | 11/2014 | Sato | 382/233 |
| 8,891,626 B1 | 11/2014 | Bankoski et al. | |
| 8,908,767 B1 | 12/2014 | Holmer | |
| 9,172,971 B2 | 10/2015 | Wahadaniah et al. | |
| 2002/0031272 A1 | 3/2002 | Bagni et al. | |
| 2002/0064228 A1 | 5/2002 | Sethuraman et al. | |
| 2002/0118754 A1 | 8/2002 | Choi | |
| 2003/0072374 A1 | 4/2003 | Sohm | |
| 2004/0001546 A1 | 1/2004 | Tourapis et al. | |
| 2004/0028131 A1 | 2/2004 | Ye et al. | |
| 2004/0066848 A1 | 4/2004 | Jeon | |
| 2004/0218674 A1 | 11/2004 | Kondo et al. | |
| 2004/0258155 A1 | 12/2004 | Lainema et al. | |
| 2005/0117646 A1 | 6/2005 | Joch et al. | |
| 2005/0123282 A1 | 6/2005 | Novotny et al. | |
| 2005/0226333 A1 | 10/2005 | Suzuki et al. | |
| 2005/0243925 A1 | 11/2005 | Bottreau | |
| 2005/0243926 A1 | 11/2005 | Hubrich et al. | |
| 2005/0254719 A1 | 11/2005 | Sullivan | |
| 2006/0114989 A1 | 6/2006 | Panda | |
| 2006/0209961 A1 | 9/2006 | Han et al. | |
| 2006/0233254 A1 | 10/2006 | Lee et al. | |
| 2006/0268166 A1 | 11/2006 | Bossen et al. | |
| 2006/0294171 A1 | 12/2006 | Bossen et al. | |
| 2007/0014358 A1 | 1/2007 | Tourapis et al. | |
| 2007/0110156 A1 | 5/2007 | Ji et al. | |
| 2007/0195881 A1 | 8/2007 | Hagiya | |
| 2007/0286280 A1 | 12/2007 | Saigo et al. | |
| 2008/0025390 A1 | 1/2008 | Shi et al. | |
| 2008/0037639 A1 | 2/2008 | Jeon | |
| 2008/0043845 A1 | 2/2008 | Nakaishi | |
| 2008/0056354 A1 | 3/2008 | Sun et al. | |
| 2008/0084931 A1 | 4/2008 | Kondo et al. | |
| 2008/0111722 A1 | 5/2008 | Reznik | |
| 2008/0159392 A1 | 7/2008 | Chiang et al. | |
| 2008/0240242 A1 | 10/2008 | Lainema | |
| 2008/0253459 A1 | 10/2008 | Ugur | |
| 2008/0291285 A1 | 11/2008 | Shimizu | |
| 2008/0310514 A1 | 12/2008 | Osamoto et al. | |
| 2008/0317127 A1 | 12/2008 | Lee et al. | |
| 2009/0016439 A1 | 1/2009 | Thoreau et al. | |
| 2009/0067497 A1 | 3/2009 | Jeon | |
| 2009/0074062 A1 | 3/2009 | Jeon | |
| 2009/0074067 A1 | 3/2009 | Jeon | |
| 2009/0110077 A1 | 4/2009 | Amano et al. | |
| 2009/0125538 A1 | 5/2009 | Rosenzweig et al. | |
| 2009/0129474 A1 | 5/2009 | Pandit et al. | |
| 2009/0290643 A1 | 11/2009 | Yang | |
| 2010/0079624 A1 | 4/2010 | Miyasako | |
| 2010/0284469 A1 | 11/2010 | Sato et al. | |
| 2010/0322301 A1 | 12/2010 | Karkkainen | |
| 2011/0026820 A1 | 2/2011 | Strom et al. | |
| 2011/0096837 A1 | 4/2011 | Demos | |
| 2011/0110428 A1 | 5/2011 | Chang et al. | |
| 2011/0170597 A1 | 7/2011 | Shi et al. | |
| 2011/0170602 A1 | 7/2011 | Lee et al. | |
| 2011/0188583 A1 | 8/2011 | Toraichi | |
| 2011/0243229 A1 * | 10/2011 | Kim et al. | 375/240.13 |
| 2011/0261886 A1 | 10/2011 | Suzuki et al. | |
| 2011/0274170 A1 | 11/2011 | Paz | |
| 2011/0293010 A1 | 12/2011 | Jeong et al. | |
| 2012/0014440 A1 | 1/2012 | Segall et al. | |
| 2012/0075535 A1 | 3/2012 | Van Beek | |
| 2012/0134415 A1 | 5/2012 | Lin et al. | |
| 2012/0263231 A1 | 10/2012 | Zhou | |
| 2012/0294363 A1 | 11/2012 | Lee et al. | |
| 2012/0300845 A1 | 11/2012 | Endresen | |
| 2012/0307905 A1 * | 12/2012 | Kim et al. | 375/240.16 |
| 2013/0003851 A1 | 1/2013 | Yu et al. | |
| 2013/0022127 A1 | 1/2013 | Park et al. | |
| 2013/0027230 A1 * | 1/2013 | Marpe et al. | 341/107 |
| 2013/0089149 A1 | 4/2013 | Hayashi et al. | |
| 2013/0089266 A1 | 4/2013 | Yang et al. | |
| 2013/0114725 A1 | 5/2013 | Lou et al. | |
| 2013/0208795 A1 | 8/2013 | Xu et al. | |
| 2014/0092975 A1 | 4/2014 | Yu et al. | |
| 2014/0098877 A1 | 4/2014 | Xu et al. | |
| 2015/0055706 A1 | 2/2015 | Xu et al. | |

FOREIGN PATENT DOCUMENTS

| | | |
|---|---|---|
| EP | 1091592 | 4/2001 |
| EP | 1158806 A1 | 11/2001 |
| EP | 1672926 | 6/2006 |
| EP | 2536146 A2 | 12/2012 |
| GB | 2477033 A | 7/2011 |
| WO | WO9941912 | 8/1999 |
| WO | WO03043342 | 5/2003 |
| WO | WO2010086041 A1 | 8/2010 |
| WO | WO2012125178 A1 | 9/2012 |
| WO | 2013036071 A2 | 3/2013 |
| WO | 2013039639 A1 | 3/2013 |
| WO | 2013042888 A2 | 3/2013 |
| WO | 2013109953 A1 | 7/2013 |

(56) References Cited

FOREIGN PATENT DOCUMENTS

OTHER PUBLICATIONS

Cassidy, Sean, An Analysis of VP8, a New Video Codec for the Web, Nov. 2011, Rochester Institute of Technology, Rochester NY.
Mozilla, Introduction to Video Coding, http://people.xiph.org/tterrible/pubs/lca2012/auckland/intro_to_video1.pdf, Last accessed May 7, 2012.
"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.
"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.
"VP8 Data Format and Decoding Guide". WebM Project. Google On2. Dated: Dec. 1, 2010.
Bankoski et al. "VP8 Data Format and Decoding Guide; draft-bankoski-vp8-bitstream-02" Network Working Group. Dated May 18, 2011.
Bankoski et al. "Technical Overview of VP8, an Open Source Video Codec for the Web". Dated Jul. 11, 2011.
Bankoski, J., Koleszar, J., Quillio, L., Salonen, J., Wilkins, P., and Y. Xu, "VP8 Data Format and Decoding Guide", RFC 6386, Nov. 2011.
Mozilla, "Introduction to Video Coding Part 1: Transform Coding", Video Compression Overview, Mar. 2012, 171 pp.
Nokia, Inc., Nokia Research Center, "MVC Decoder Description", Telecommunication Standardization Sector, Study Period 1997-2000, Geneva, Feb. 7, 2000, 99 pp.
Series H: Audiovisual and Multimedia Systems, "Infrastructure of audiovisual services—Coding of moving video, Video coding for low bit rate communication", International Telecommunication Union, ITU-T Recommendation H.263, Feb. 1998, 167 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Chen, Xing C., et al.; "Quadtree Based Adaptive Lossy Coding of Motion Vectors", IEEE 1996, 4 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Strobach, Peter; "Tree-Structured Scene Adaptive Coder", IEEE Transactions on Communications, vol. 38, No. 4, Apr. 1990, 10 pp.
Steliaros, Michael K., et al.; "Locally-accurate motion estimation for object-based video coding", SPIE vol. 3309, 1997, 11 pp.
Martin, Graham R., et al.; "Reduced Entropy Motion Compensation Using Variable Sized Blocks", SPIE vol. 3024, 1997, 10 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Guillotel, Philippe, et al.; "Comparison of motion vector coding techniques", SPIE vol. 2308, 1994, 11 pp.
Orchard, Michael T.; "Exploiting Scene Structure in Video Coding", IEEE 1991, 5 pp.
Liu, Bede, et al.; "A simple method to segment motion field for video coding", SPIE vol. 1818, Visual Communications and Image Processing 1992, 10 pp.
Ebrahimi, Touradj, et al.; "Joint motion estimation and segmentation for very low bitrate video coding", SPIE vol. 2501, 1995, 12 pp.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wiegand, Thomas, et al.; "Long-Term Memory Motion-Compensated Prediction", Publication Unknown, Date Unknown, 15 pp.
Chen, Michael C., et al.; "Design and Optimization of a Differentially Coded Variable Block Size Motion Compensation System", IEEE 1996, 4 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Nicolas, H., et al.; "Region-based motion estimation using deterministic relaxation schemes for image sequence coding", IEEE 1992, 4 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Bossen, F., "Common test Conditions and Software Reference Configurations," Joint Collaborative Team on Video Coding, JCTVC-D600, Jan. 2011.
Bross, Benjamin et al.: "High Efficiency Video Coding (HEVC) text specification draft 8," Joint Collaborative Team on Video Coding(JCT-VC) of ISO/IEC JTC1/SC29/WG11 and ITU-T SG16 WP3, document JCTVC-J1003_d7, 10th Meeting : Stockholm, SE, Jul. 11-20, 2012, all pages.
Hong D et al.: "Scalabilty Support in HEVC", 97, MPEG Meeting; Jul. 18, 2011-Jul. 22, 2011; Torino; (Motion Picture Expert Group or ISO/IEC JTC1/SC29/WG11), no.m20710, Jul. 13, 2011, all pages.
ISR & Written Opinion, Re: Application # PCT/US2012/044726; Sep. 27, 2012.
ISR, "ISR Search Report and Written Opinion of the International Searching Authority" for International Application No. ISR/US2012/063434 dated Feb. 12, 2013, 15 pages.

(56) References Cited

OTHER PUBLICATIONS

ISR, "ISR Search Report and Written Opinion of the International Searching Authority" for International Application No. ISR/US2013/060100 dated Nov. 21, 2013, 11 pages.

Jianghong Guo et al., A Novel Criterion for Block Matching Motion Estimation, Oct. 123, 1998, IEEE, vol. 1 pp. 841-844.

Kang J W et al.: "Description of Scalable video coding technoloogy proposal by ETRI and Kwangwoon Univ",11, JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG16); URL: http://wftp3.itu.int/av-arch/jctvc-site/. No. JCTVC-K0037, Oct. 1, 2012, all pages.

Karcxewicz (Qualcomm) M et al., "Video coding technology proposal by Qualcomm," 1. JCT-VC Meeting;; Apr. 15, 2010-Apr. 23, 2010; Dresden; (Joint Collaborative Team on Video Coding of ISO/IEC JTC1/SC29/WG11 and ITU-T SG16); URL: http://wftp3.itu.int/av-arch/jctvc-site/, Apr. 16, 2010, XP030007586, ISSN:0000-0049.

Lou J et al., "CE:3: Fixed interpolation filter tests by Motorla Mobility," 6. JCT-VC Meeting; 97. Mpeg Meeting; Jul. 14, 2011-Jul. 22, 2011; Torino; (Joint Collaborative Team on Video Coding of ISO/IEC JTC1/SC29/WG11 and ITU-T SG16); URL: http://wftp3.itu.int/av-arch/jctvc-site/. No. JCTVC-F574, Jul. 3, 2011, XP030009597.

Lou J et al., "Motion Vector Scaling for non-uniform interpolation offset," 7. JCT-VC Meeting; 98. Mpeg Meeting; Nov. 21, 2011-Nov. 30, 2011; Geneva; (Joint Collaborative Team on Video Coding of ISO/IEC JTC1/SC29/WG11 and ITU-T SG16); URL: http://wftp3.itu.int/av-arch/jctvc-site/. No. JCTVC-G699, Nov. 9, 2011, XP030110683.

McCann et al., "Video Coding Technology Proposal by Samsung(and BBC)," Joint Collaborative Team on Video Coding, 1st Meeting, Dresden, Germany, JCTVC-A124, Apr. 15-23, 2010.

Park, Jun Sung, et al., "Selective Intra Prediction Mode Decision for H.264/AVC Encoders", World Academy of Science, Engineering and Technology 13, (2006).

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Zheng, Y et al., Unified Motion Vector Predictor Selection for merge and AMVP, Mar. 2011.

Zheng et al., "Extended Motion Vector Prediction for Bi Predictive Mode," Joint Collaborative Team on Video Coding Geneva, Mar. 2011.

European Office Action for EP12737396.7 mailed Oct. 30, 2015, 7 pages.

Jeon, Y et al: "Non-CE9: improvement on parallelized merge/skip mode", No. JCTVC-G164, Nov. 8, 2011. 7 pages.

International Search Report and Written Opinion for related application PCT/US2013/063723, mailed Feb. 2, 2012.

Laroche G. Et al.: "RD Optimized Coding for Motion Vector Predictor Selection", IEEE Transactions on Circuits and Systems for Video Technology, vol. 18, No. 9, Sep. 1, 2008.

Li S et al.: "Direct Mode Coding for Bipredictive Slices in the H.264 Standard", IEEE Transations on Circuits and Systems for Video Technology, vol. 15, Jan. 1, 2005.

Steffen Kamp et al.: "Decoder side motion vector derivation for inter frame video coding" Image Processing, 2008, 15th IEEE International ConferexNCe, Oct. 12, 2008.

Steffen Kamp et al.: "Improving AVC Compression performaxNCe by template matching with decoder-side motion vector derivation", 84. MPEG Meeting; Feb. 5, 2008.

Ueda M et al.: "TE1: Refinement Motion Compensation using Decoder-side Motion Estimation" JCT-VC Meeting; Jul. 28, 2007.

Wiegand et al., "WD3: Working Draft 3 of High-EfficiexNCy Video Coding," JCTVC-E603, Mar. 29, 2011, all pages.

Yi-Jen Chiu et al.: "Self-derivation of motion estimation techniques to improve video coding efficiexNCy", Proceedings of SPIE, vol. 7798, Aug. 19, 2010.

Y-Jen Chiu et al.: "Fast Techniques to Improve Self Derivation of Motion Estimation" JCT-VC Meeting, Jul. 28, 2010.

Yue Wang et al.: "Advanced spatial and temporal direct mode for B picture coding", Visual Communications and Image Processing (VCIP), 2011 Ieee, Nov. 6, 2011, pp. 1-4.

Y-W Huang et al.: "Decoder-side Motion Vector Derivation with Switchable Template Matching" JCT-VC Meeting Jul. 28, 2010.

Minhua Zhou, Parallelized merge/skip mode for HEVC,Joint Collaborative Team on Video Coding (JCT-VC) of ITU-T SG16 WP3 and ISO/IEC JTC1/SC29/WG11, 6th Meeting: Torino, IT, Jul. 2011, JCTVC-F069, pp. 1-13.

Yue Yu et al., Simplification of MVP Design for HEVC, Joint Collaborative Team on Video Coding (JCT-VC) of ITU-T SG16 WP3 and ISO/IEC JTC1/SC29/WG11,6th Meeting: Torino, IT, Jul. 2011, JCTVC-F575, pp. 1-5.

Yongjoon Jeon et al.,Non-CE9: improvement on parallelized merge/skip mode,Joint Collaborative Team on Video coding (JCT-VC)of ITU-T SG16 WP3 and ISO/IEC JTC1/SC29/WG11,7th Meeting: Geneva, CH,Nov. 8, 2011,JCTVC-3164,pp. 1-7.

\* cited by examiner

DETERMINE REFERENCE MOTION VECTORS

TECHNICAL FIELD

This disclosure relates to video encoding and decoding.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

SUMMARY

Implementations of systems, methods, and apparatuses for encoding and decoding a video signal using reference motion vector are disclosed herein. One aspect of the disclosed implementations is a method for encoding a video stream having a plurality of blocks including a current block. The method includes identifying, from a plurality of previously coded blocks, a plurality of candidate motion vectors; identifying, for the current block, a set of reconstructed pixel values corresponding to a set of previously coded pixel values; determining, for at least one of the plurality of candidate motion vectors, an error value based on the set of reconstructed pixel values and a set of predicted values for the set of previously coded pixel values; and selecting, from the plurality of candidate motion vectors, a reference motion vector for the current block based on the error value.

Another aspect of the disclosed implementations is a method for decoding an encoded video stream having a plurality of blocks including a current block. The method includes identifying, from a plurality of previously decoded blocks, a plurality of candidate motion vectors; identifying, for the current block, a set of reconstructed pixel values corresponding to a set of previously coded pixel values; determining, for at least one of the plurality of candidate motion vectors, an error value based on the set of reconstructed pixel values and a set of predicted values for the set of previously decoded pixel values; and selecting, from the plurality of candidate motion vectors, a reference motion vector for the current block based on the error value.

Another aspect of the disclosed implementations is an apparatus for encoding a video stream having a plurality of blocks including a current block. The apparatus includes a memory and a processor configured to execute instructions stored in the memory to identify, from a plurality of previously coded blocks, a plurality of candidate motion vectors; identify, for the current block, a set of reconstructed pixel values corresponding to a set of previously coded pixel values; determine, for at least one of the plurality of candidate motion vectors, an error value based on the set of reconstructed pixel values and a set of predicted values for the set of previously coded pixel values; and select, from the plurality of candidate motion vectors, a reference motion vector for the current block based on the error value.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
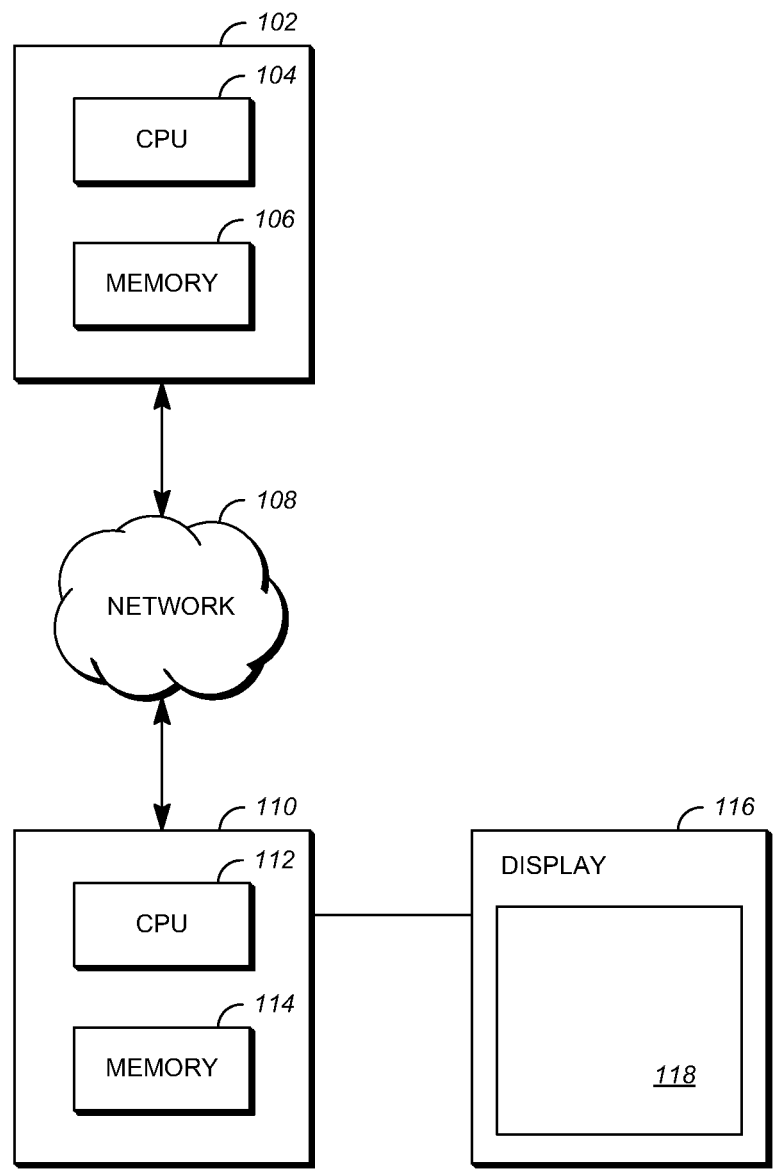
FIG. 1 is a schematic of a video encoding and decoding system in accordance with implementations of this disclosure.

Digital video is used for various purposes, including, for example, remote business meetings via video conferencing, high definition video entertainment, video advertisements, or sharing of user-generated videos. Video encoding and decoding (codec) can use various compression schemes. These compression schemes may include breaking a video image into blocks and generating a digital video output bitstream using one or more techniques to limit the information included in the output. A received bitstream can be decoded to re-create the blocks and the source images from the limited information.

Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block.

Inter prediction can include determining a motion vector for encoding a block based on a corresponding block in a reference frame of the video stream. For example, the motion vector can be identified using a method of motion estimation, such as a motion search. For video compression schemes, the number of bits used to encode the motion vectors can be significant, especially for video streams encoded at lower data rates or higher compression ratios. To improve the encoding efficiency, a motion vector can be differentially encoded using a reference motion vector, i.e., only the difference between the motion vector and the reference motion vector is encoded. In some instances, the reference motion vector can be selected from previously used motion vectors in the video stream, for example, the last non-zero motion vector from neighboring blocks.

In implementations of this disclosure, a reference motion vector can be selected from candidate motion vectors based on a match score (also referred to "error value"). For example, the match score can be based on the results of using the candidate motion vectors to predict a "trial" set of previously coded pixel values close to the current block. Since the trial set has already been encoded and reconstructed, the predicted values can be compared against the corresponding reconstructed values to determine the match score. Due to the proximity of the trial set to the current block, it is likely that the current block has similar motion characteristics. Thus, a candidate motion vector that is the best match in predicting the trial set is likely to closely resemble the actual motion vector determined for the current block, which has similar motion characteristics. When the reference motion vector selected as the candidate motion vector closely resembles the actual motion vector, fewer bits can be used to code the motion vector, thus improving the overall coding efficiency.

FIG. 1 is a schematic of a video encoding and decoding system 100 in which aspects of the disclosure can be implemented. An exemplary transmitting station 102 can be, for example, a computer having an internal configuration of hardware including a processor such as a central processing unit (CPU) 104 and a memory 106. CPU 104 is a controller for controlling the operations of transmitting station 102. CPU 104 can be connected to the memory 106 by, for example, a memory bus. Memory 106 can be read only memory (ROM), random access memory (RAM) or any other suitable memory device. Memory 106 can store data and program instructions that are used by CPU 104. Other suitable implementations of transmitting station 102 are possible. For example, the processing of transmitting station 102 can be distributed among multiple devices.

A network 108 connects transmitting station 102 and a receiving station 110 for encoding and decoding of the video stream. Specifically, the video stream can be encoded in transmitting station 102 and the encoded video stream can be decoded in receiving station 110. Network 108 can be, for example, the Internet. Network 108 can also be a local area network (LAN), wide area network (WAN), virtual private network (VPN), a cellular telephone network or any other means of transferring the video stream from transmitting station 102 to, in this example, receiving station 110.

Receiving station 110 can, in one example, be a computer having an internal configuration of hardware including a processor such as a CPU 112 and a memory 114. CPU 112 is a controller for controlling the operations of receiving station 110. CPU 112 can be connected to memory 114 by, for example, a memory bus. Memory 114 can be ROM, RAM or any other suitable memory device. Memory 114 can store data and program instructions that are used by CPU 112. Other suitable implementations of receiving station 110 are possible. For example, the processing of receiving station 110 can be distributed among multiple devices.

A display 116 configured to display a video stream can be connected to receiving station 110. Display 116 can be implemented in various ways, including by a liquid crystal display (LCD), a cathode-ray tube (CRT), or a light emitting diode display (LED), such as an OLED display. Display 116 is coupled to CPU 112 and can be configured to display a rendering 118 of the video stream decoded in receiving station 110.

Other implementations of the encoder and decoder system 100 are also possible. For example, one implementation can omit network 108 and/or display 116. In another implementation, a video stream can be encoded and then stored for transmission at a later time by receiving station 110 or any other device having memory. In one implementation, receiving station 110 receives (e.g., via network 108, a computer bus, or some communication pathway) the encoded video stream and stores the video stream for later decoding. In another implementation, additional components can be added to the encoder and decoder system 100. For example, a display or a video camera can be attached to transmitting station 102 to capture the video stream to be encoded.

Figure 2:
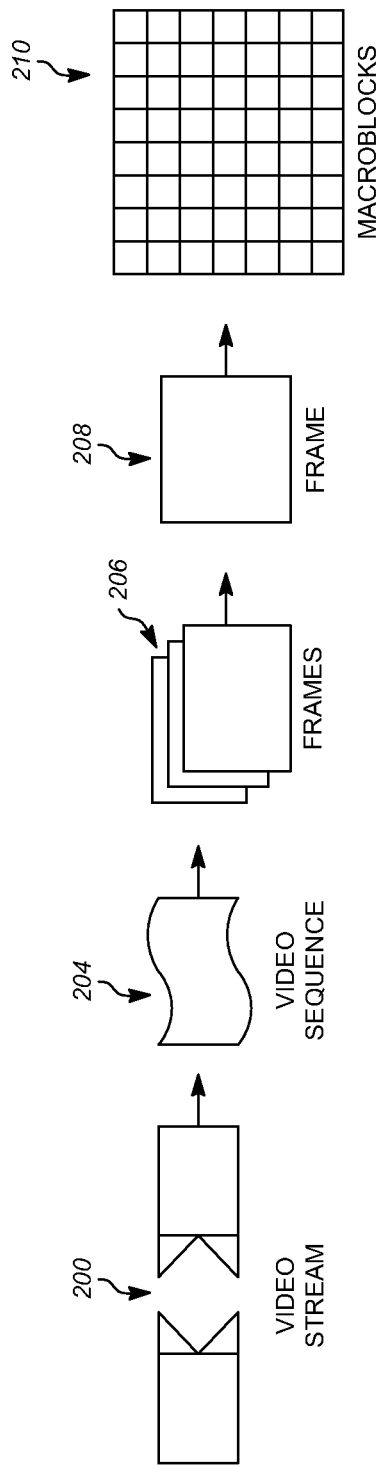
FIG. 2 is a diagram of an example video stream to be encoded and decoded in accordance with implementations of this disclosure.

FIG. 2 is a diagram of an example video stream 200 to be encoded and decoded. Video stream 200 (also referred to herein as video data) includes a video sequence 204. At the next level, video sequence 204 includes a number of adjacent frames 206. While three frames are depicted in adjacent frames 206, video sequence 204 can include any number of adjacent frames. Adjacent frames 206 can then be further subdivided into individual frames, e.g., a single frame 208. Each frame 208 can capture a scene with one or more objects, such as people, background elements, graphics, text, a blank wall, or any other information.

At the next level, single frame 208 can be divided into a set of blocks 210, which can contain data corresponding to, in some of the examples described below, a 8×8 pixel group in frame 208. Block 210 can also be of any other suitable size such as a block of 16×8 pixels, a block of 8×8 pixels, a block of 16×16 pixels, a block of 4×4 pixels, or of any other size. Unless otherwise noted, the term 'block' can include a macroblock, a subblock (i.e., a subdivision of a macroblock), a segment, a slice, a residual block or any other portion of a frame. A frame, a block, a pixel, or a combination thereof can include display information, such as luminance information, chrominance information, or any other information that can be used to store, modify, communicate, or display the video stream or a portion thereof.

Figure 3:
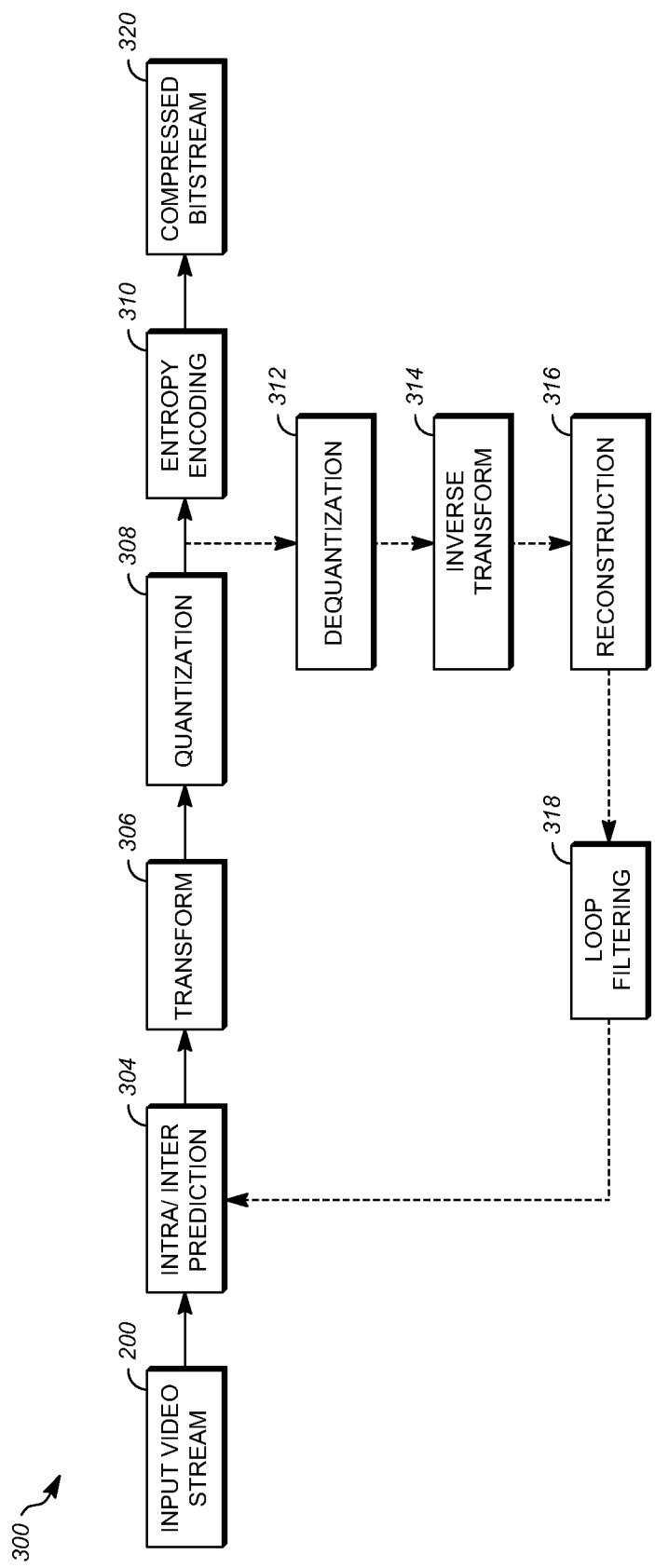
FIG. 3 is a block diagram of a video compression system in accordance with implementations of this disclosure.

FIG. 3 is a block diagram of an encoder 300 in accordance with implementations of this disclosure. Encoder 300 can be implemented, as described above, in transmitting station 102 such as by providing a computer software program stored in memory 106, for example. The computer software program can include machine instructions that, when executed by CPU 104, cause transmitting station 102 to encode video data in the manner described in FIG. 3. Encoder 300 can also be implemented as specialized hardware in, for example, transmitting station 102. Encoder 300 has the following stages to perform the various functions in a forward path (shown by the solid connection lines) to produce an encoded or a compressed bitstream 320 using input video stream 200: an intra/inter prediction stage 304, a transform stage 306, a quantization stage 308, and an entropy encoding stage 310. Encoder 300 may include a reconstruction path (shown by the dotted connection lines) to reconstruct a frame for encoding of future blocks. In FIG. 3, encoder 300 has the following stages to perform the various functions in the reconstruction path: a dequantization stage 312, an inverse transform stage 314, a reconstruction stage 316, and a loop filtering stage 318. Other structural variations of encoder 300 can be used to encode video stream 200.

When video stream 200 is presented for encoding, each frame 208 within video stream 200 can be processed in units of blocks. Referring to FIG. 3, at intra/inter prediction stage 304, each block can be encoded using either intra prediction (i.e., within a single frame) or inter prediction (i.e. from frame to frame). In either case, a prediction block can be formed. The prediction block is then subtracted from the block to produce a residual block (also referred to herein as residual).

Intra prediction (also referred to herein as intra-prediction or intra-frame prediction) and inter prediction (also referred to herein as inter-prediction or inter-frame prediction) are techniques used in modern image/video compression schemes. In the case of intra-prediction, a prediction block can be formed from samples in the current frame that have been previously encoded and reconstructed. In the case of inter-prediction, a prediction block can be formed from samples in one or more previously constructed reference frames.

The prediction block is then subtracted from the block; the difference, i.e., the residual is then encoded and transmitted to decoders. Image or video codecs may support many different intra and inter prediction modes; each image block can use one of the prediction modes to provide a prediction block that is most similar to the block to minimize the information to be encoded in the residual. The prediction mode for each block of transform coefficients can also be encoded and transmitted, so a decoder can use same prediction mode(s) to form prediction blocks in the decoding and reconstruction process.

The prediction mode can be selected from one of multiple intra-prediction modes. The multiple intra-prediction modes can include, for example, DC prediction mode, horizontal prediction mode, vertical prediction mode, and true motion prediction mode (which can also be referred to as TM_PRED). In one implementation of DC prediction mode, a single value using the average of the pixels in a row above a current block and a column to the left of the current block can be used to predict the current block. In one implementation of horizontal prediction, each column of a current block can be filled with a copy of a column to the left of the current block. In one implementation of vertical prediction, each row of a current block can be filled with a copy of a row above the current block. In one implementation of TrueMotion prediction, in addition to the row above the current block and the column to the left of the current block, TM_PRED uses the pixel P above and to the left of the block. Horizontal differences between pixels in the row above the current block (starting from P) are propagated using the pixels from the column to the left of the current block to start each row. Other intra-prediction modes can also be used.

The prediction mode can also be selected from one of multiple inter-prediction modes using one or more reference frames including, for example, last frame, golden frame, alternative reference frame, or any other reference frame in an encoding scheme. The inter prediction modes can include, for example, ZERO_MV mode in which a block from the same location within a reference frame is used as the prediction block; NEW_MV mode in which a motion vector is transmitted to indicate the location of a block within a reference frame to be used as the prediction block; NEAREST_MV mode in which no motion vector is transmitted and the current block uses the last non-zero motion vector used by previously coded blocks to generate the prediction block. When an inter-prediction mode of NEW_MV is selected, a motion vector can be encoded, which describes the position of the prediction block relative to the current block (e.g., offsets of the coordinates).

Next, still referring to FIG. 3, transform stage 306 transforms the residual into a block of transform coefficients in, for example, the frequency domain. Examples of block-based transforms include the Karhunen-Loève Transform (KLT), the Discrete Cosine Transform (DCT), Walsh-Hadamard Transform (WHT), and the Singular Value Decomposition Transform (SVD). In one example, the DCT transforms the block into the frequency domain. In the case of DCT, the transform coefficient values are based on spatial frequency, with the lowest frequency (e.g., DC) coefficient at the top-left of the matrix and the highest frequency coefficient at the bottom-right of the matrix.

Quantization stage 308 converts the block of transform coefficients into discrete quantum values, which are referred to as quantized transform coefficients, using a quantizer value or quantization levels. The quantized transform coefficients are then entropy encoded by entropy encoding stage 310. The entropy-encoded coefficients, together with other information used to decode the block, which can include for example the type of prediction used, motion vectors, and quantization value, are then output to compressed bitstream 320. Compressed bitstream 320 can be formatted using various techniques, such as variable length encoding (VLC) and arithmetic coding. Compressed bitstream 320 can also be referred to as an encoded video stream and the terms will be used interchangeably herein.

The reconstruction path in FIG. 3 (shown by the dotted connection lines) can be used to provide both encoder 300 and a decoder 400 (described below) with the same reference frames to decode compressed bitstream 320. The reconstruction path performs functions that are similar to functions that take place during the decoding process that are discussed in more detail below, including dequantizing the quantized transform coefficients at dequantization stage 312 to generate dequantized transform coefficients and inverse transforming the dequantized transform coefficients at inverse transform stage 314 to produce a derivative residual block (i.e., derivative residual). At reconstruction stage 316, the prediction block that was predicted at intra/inter prediction stage 304 can be added to the derivative residual to create a reconstructed block. In some implementations, loop filtering stage 318 can be applied to the reconstructed block to reduce distortion such as blocking artifacts.

Other variations of encoder 300 can be used. For example, a non-transform based encoder 300 can quantize the residual block directly without transform stage 304. In another implementation, an encoder 300 can have quantization stage 308 and dequantization stage 312 combined into a single stage.

Figure 4:
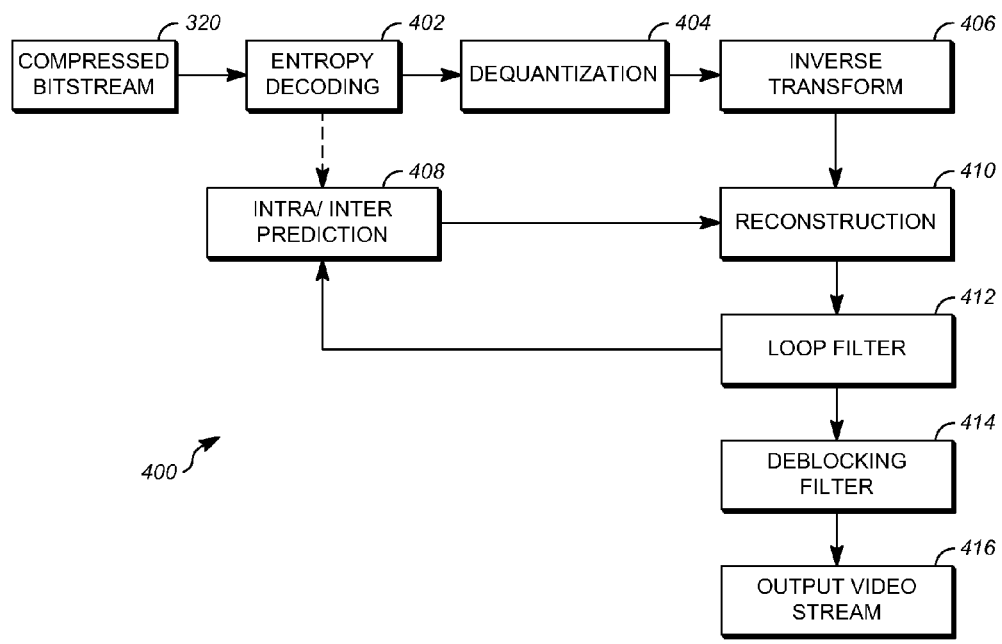
FIG. 4 is a block diagram of a video decompression system in accordance with implementations of this disclosure.

FIG. 4 is a block diagram of a decoder 400 in accordance with implementations of this disclosure. Decoder 400 can be implemented, for example, in receiving station 110, such as by providing a computer software program stored in memory for example. The computer software program can include machine instructions that, when executed by CPU 112, cause receiving station 110 to decode video data in the manner described in FIG. 4. Decoder 400 can also be implemented as specialized hardware or firmware in, for example, transmitting station 102 or receiving station 110.

Decoder 400, similar to the reconstruction path of encoder 300 discussed above, includes in one example the following stages to perform various functions to produce an output video stream 416 from compressed bitstream 320: an entropy decoding stage 402, a dequantization stage 404, an inverse transform stage 406, an intra/inter prediction stage 408, a reconstruction stage 410, a loop filtering stage 412, and a deblocking filtering stage 414. Other structural variations of decoder 400 can be used to decode compressed bitstream 320.

When compressed bitstream 320 is presented for decoding, the data elements within compressed bitstream 320 can be decoded by the entropy decoding stage 402 (using, for example, Context Adaptive Binary Arithmetic Decoding) to produce a set of quantized transform coefficients. Dequantization stage 404 dequantizes the quantized transform coefficients and inverse transform stage 406 inverse transforms the dequantized transform coefficients to produce a derivative residual that can be identical to that created by reconstruction stage 316 in encoder 300. Using header information decoded from compressed bitstream 320, decoder 400 can use intra/inter prediction stage 408 to create the same prediction block as was created in encoder 300, e.g., at intra/inter prediction stage 304.

At reconstruction stage 410, the prediction block can be added to the derivative residual to create a reconstructed block that can be identical to the block created by reconstruction stage 316 in encoder 300. In some implementations, loop filtering stage 412 can be applied to the reconstructed block to reduce blocking artifacts. Deblocking filtering stage 414 can be applied to the reconstructed block to reduce blocking distortion, and the result is output as output video stream 416. Output video stream 416 can also be referred to as a decoded video stream and the terms will be used interchangeably herein.

Other variations of decoder 400 can be used to decode compressed bitstream 320. For example, decoder 400 can produce output video stream 416 without deblocking filtering stage 414.

Figure 5:
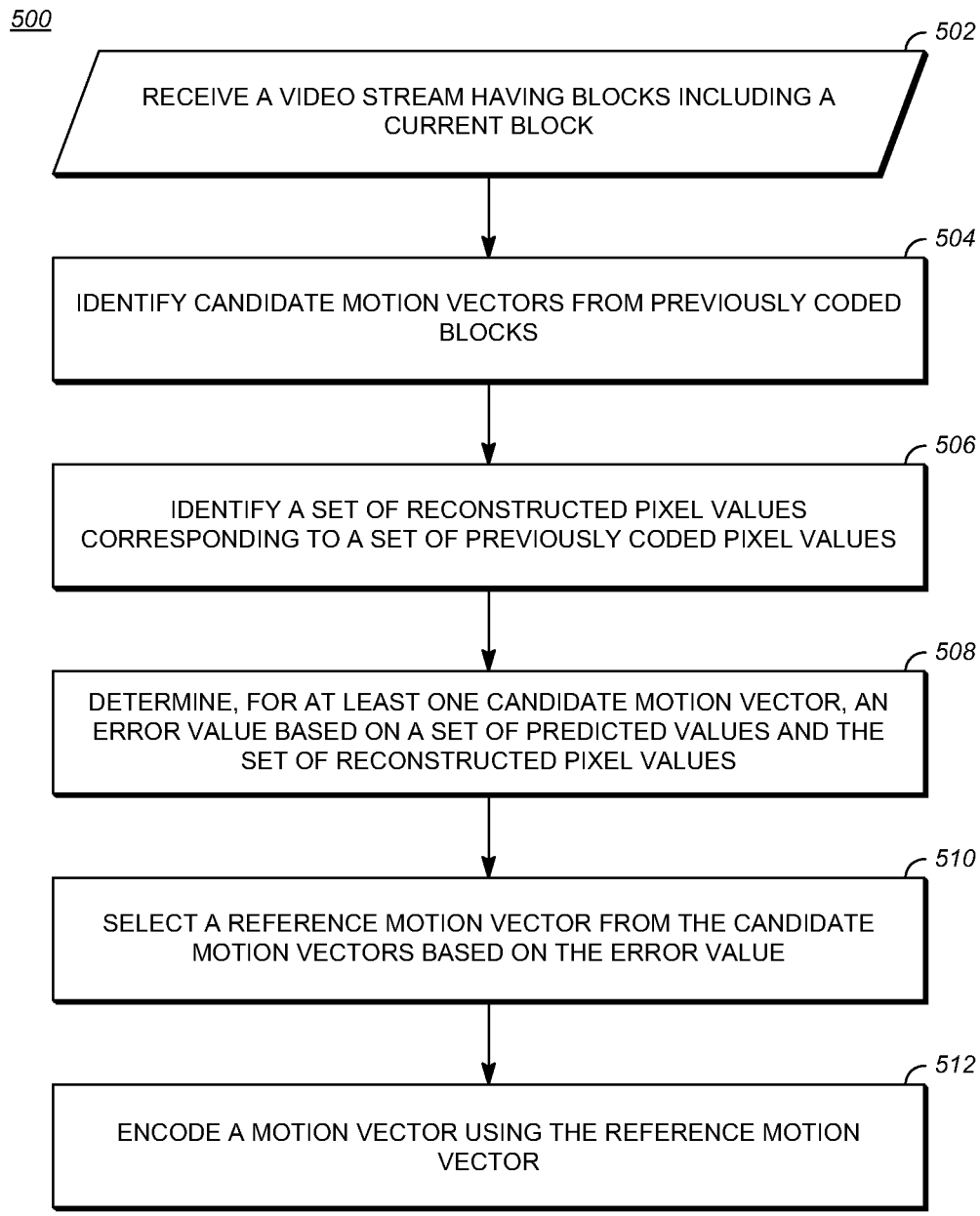
FIG. 5 is a flow diagram of an example method of operation for encoding a video stream using reference motion vectors in accordance with implementations of this disclosure.

FIG. 5 is a flowchart showing an example method of operation 500 for encoding a video stream using reference motion vectors in accordance with implementations of this disclosure. Method of operation 500 can be implemented in an encoder such as encoder 300 (shown in FIG. 3) and can be implemented, for example, as a software program that can be executed by computing devices such as transmitting station 102 or receiving station 110 (shown in FIG. 1). For example, the software program can include machine-readable instructions that can be stored in a memory such as memory 106 or memory 114, and that can be executed by a processor, such as CPU 104, to cause the computing device to perform method of operation 500.

Method of operation 500 can be implemented using specialized hardware or firmware. Some computing devices can have multiple memories, multiple processors, or both. The steps of method of operation 500 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps.

Implementations of method of operation 500 can include, for example, receiving a video stream having blocks of video data including a current block at a step 502, identifying candidate motion vectors from previously coded blocks at a step 504, identifying a set of reconstructed pixel values corresponding to a set of previously coded pixel values at a step 506, determining, for at least one candidate motion vector, an error value based on a set of predicted values and the set of reconstructed pixel values at a step 508, selecting a reference motion vector from the candidate motion vectors based on the error value at a step 510, and encoding a motion vector using the reference motion vector at a step 512.

At step 502, a video stream having multiple blocks of video data can be received by a computing device, such as transmitting station 102. The video stream can include multiple frames including a current frame; the current frame can include multiple blocks including a current block. Received, as used herein, includes acquired, obtained, read, or received in any manner whatsoever. The video data or stream can be received in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device.

At step 504, multiple candidate motion vectors can be identified from previously coded blocks in the video stream. The previously coded blocks in the video stream can include any block encoded using inter-prediction prior to the current block, such as a block from previously coded frames or a block from the same frame as the current block that has been encoded prior to the current block. For example, in some codec schemes such as the ones that use raster scanned coding, the previously coded blocks can include a block above, to the left, or to the above-left of the current block in the same frame. The previously coded blocks can also include, for example, a block from the immediately previous frame (i.e., last frame), a block from the golden frame (described at intra/inter prediction stage 304), a block from any other reference frame, or any combination thereof. The motion vectors from the previously coded blocks can be identified as candidate motion vectors, which can be used to determine the reference motion vector for the current block.

At step 506, a set of reconstructed pixel values corresponding to a set of previously coded pixel values can be identified. In some implementations, the set of previously coded pixel values can include one or more rows of pixel values above the current block, or one or more columns of pixel values to the left of the current block, or both. For simplicity, the following examples are described using data in the two rows immediately above and the two columns immediately to the left of the current block. In other implementations, data from rows or columns not immediately adjacent to the current block, including data from blocks that are not adjacent to the current block, can be included in the set of previously coded pixel values. Due to the proximity of the set of previously coded pixel values to the current block, it is likely that the current block has similar motion characteristics as the set of previously coded pixel values. The set of reconstructed pixel values corresponding to the set of previously coded pixel values can be determined, for example, using the reconstruction path in FIG. 3 at encoder 300.

At step 508, an error value can be determined for at least one of the candidate motion vectors based on the set of reconstructed pixel values and a set of predicted values for the set of previously coded pixel values.

The candidate motion vectors can be the candidate motion vectors identified at step 504. The set of predicted values can be determined based on a reference frame by applying a candidate motion vector to the set of previously coded pixel values (see FIG. 8 for an example). For the candidate motion vector, the error value (also referred to herein as "match score") can be determined by comparing the set of predicted pixel values against the set of reconstructed pixel values identified at step 506. Step 508 can be implemented, for example, at intra/inter prediction stage 306 of encoder 300 in FIG. 3.

In some implementations, step 508 determines, for each candidate motion vector, a corresponding set of predicted values for the set of previously coded pixel values. Then, an error value (or match score) can be determined for each candidate motion vector based on a difference between the set of predicted values and the set of reconstructed pixel values obtained at step 506.

The error value (or match score) can be determined using metrics such as sum of absolute difference (SAD), sum of squared error (SSE), mean squared error (MSE), or any other error metric. For example, when SAD is used, the set of predicted values can be compared against the set of reconstructed pixel values to determine the SAD value for each motion vector. In some implementations, different weights can be associated with different pixels in the set of previously coded pixel values. For example, more weight can be given to the row or column of pixels immediately adjacent to the current block, or less weight can be given to the row or column of pixels further away from the current block.

At step 510, a reference motion vector can be selected for the current block from the candidate motion vectors. The selection can be based on, for example, selecting the candidate motion vector associated with the best match score, which can be, for example, the candidate motion vector with the lowest error value among all the candidate motion vectors. Other selection criteria can also be used.

At step 512, in some implementations, a motion vector can be encoded for the current block using the reference motion vector selected at step 510. The motion vector can be determined for the current block using any motion compensation technique. The encoded motion vector can be stored or transmitted in the encoded video stream 320.

In one implementation, the reference motion vector selected at step 510 can be used to differentially encode the motion vector for the current block. For example, a difference value can be calculated by subtracting the reference motion vector from the motion vector, which can be encoded.

In another implementation, the reference motion vector can be used to identify a probability distribution, which can be used to encode a magnitude value of the motion vector for the current block.

In another implementation, the reference motion vector can be used as the motion vector for encoding or decoding of the current block. When the difference between the reference motion vector and the motion vector is small (or zero), difference in prediction results between using the reference motion vector and the motion vector is also small (or zero). In such cases the motion vector may not be encoded.

Although not shown in FIG. 5, the residual, which can be determined based on the difference between the current block and the predicted values for the current block using the motion vector, such as the motion vector determined at step 512, can be encoded. For example, the residual can be quantized at quantization stage 308 (of FIG. 3), entropy coded at entropy encoding stage 310, and can be stored or transmitted in the encoded video stream 320. The encoded video stream 320 can be transmitted, stored, further processed, or a combination thereof. For example, the encoded video stream 320 can be stored in a memory, such as the memory 106 or 114 shown in FIG. 1. The encoded video stream 320 can also be transmitted to a decoder, such as the decoder 400 shown in FIG. 4.

Method of operation 500 is depicted and described as a series of steps. However, steps in accordance with this disclosure can occur in various orders or concurrently. For example, the set of previously coded pixel values in step 506 can be identified before or concurrently with the candidate motion vectors in step 504. Additionally, steps in accordance with this disclosure may occur with other steps not presented and described herein. Furthermore, not all illustrated steps may be required to implement a method of transform-domain intra prediction. For example, the motion vector for the current block may not be encoded.

Figures 6, 7:
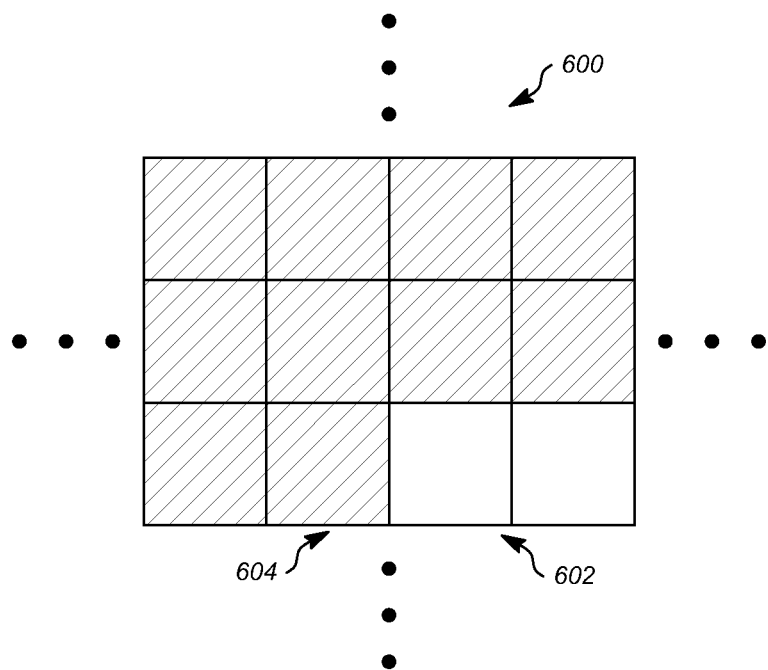
FIG. 6 is a diagram of an example of a frame including a current block in accordance with implementations of this disclosure.
FIG. 7 is a diagram of an example of the current block of FIG. 6 and a set of previously coded pixel values in accordance with implementations of this disclosure.

FIG. 6 shows a diagram of an example of a frame 600 including a current block 602 in accordance with implementations of this disclosure. Frame 600 can include blocks that have been encoded prior to current blocks, such as the blocks (shown in shade) to the left or above of current block 602 in FIG. 6. For example, a block 604 to the immediate left of current block 602 is a previously coded block that can be identified at step 504.

FIG. 7 shows a diagram of an example of current block 602 of FIG. 6 and a set of previously coded pixel values 702 in accordance with implementations of this disclosure. The set of previously coded pixel values 702 can include, for example, two rows of pixels 702A-B immediately above of current block 602 and two columns of pixels 702C-D to the immediate left of current block 602. However, other previously coded pixels values (not shown in FIG. 7) can also be used. Blocks, such as current block 602 and previously coded block 604, are shown in FIG. 7 to have a set of 8×8 pixels, which can be represented by an 8×8 matrix. However, any other block size can be used.

Figure 8:
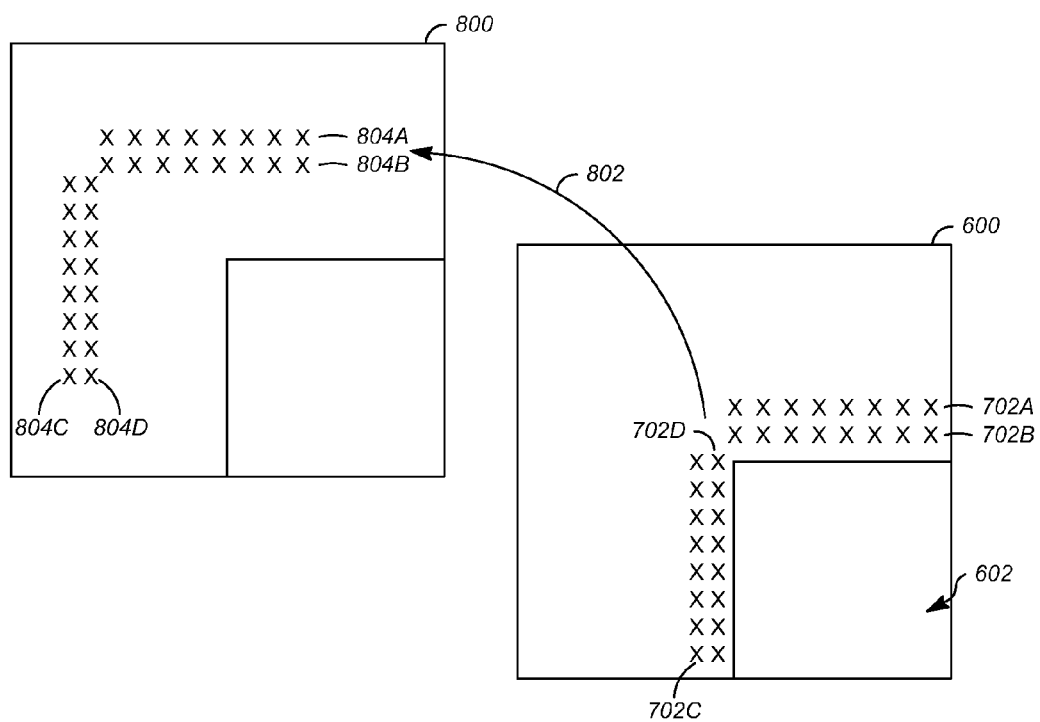
FIG. 8 is a diagram of an example of a set of predicted values for the set of previously coded pixel values of FIG. 7 in accordance with implementations of this disclosure.

FIG. 8 shows a diagram of an example of a set of predicted values for the set of previously code pixel values 702 of FIG. 7 in accordance with implementations of this disclosure. The set of predicted values can be determined using a candidate motion vector 802, which can be identified at step 504. Candidate motion vector 802 can be associated with, for example, previously coded block 604, which is the block to the immediate left of current block 602 in frame 600. The set of previously coded pixel values 702 can include, for example, two rows 702A-B and two columns 702C-D, as described above in FIG. 7. The set of reconstructed pixel values (not shown) corresponding to the set of previously coded pixel values 702 can be identified at step 506.

As seen in FIG. 8, the set of predicted values can be determined for the set of previously coded pixel values 702 using candidate motion vector 802. Based on the offsets indicated by candidate motion vector 802, rows 702A-B can be predicted by rows 804A-B in reference frame 800 and columns 702C-D can be predicted by columns 804C-D in reference frame 800. As described above in step 508, an error value can be determined for candidate motion vector 802. For example, the set of predicted values 804A-D can be compared against the set of reconstructed values for the set of pixel values 702A-D to determine the error value. Error values can be similarly determined for other candidate motion vectors (not shown in FIG. 8). As described above in step 510, the candidate motion vector associated with the lowest error value can be selected as the reference motion vector. For example, if it is determined that candidate motion vector 802 has the lowest error value among the candidate motion vectors, candidate motion vector 802 can be selected as the reference motion vector, which can be used to encode the motion vector for current block 602.

Figure 9:
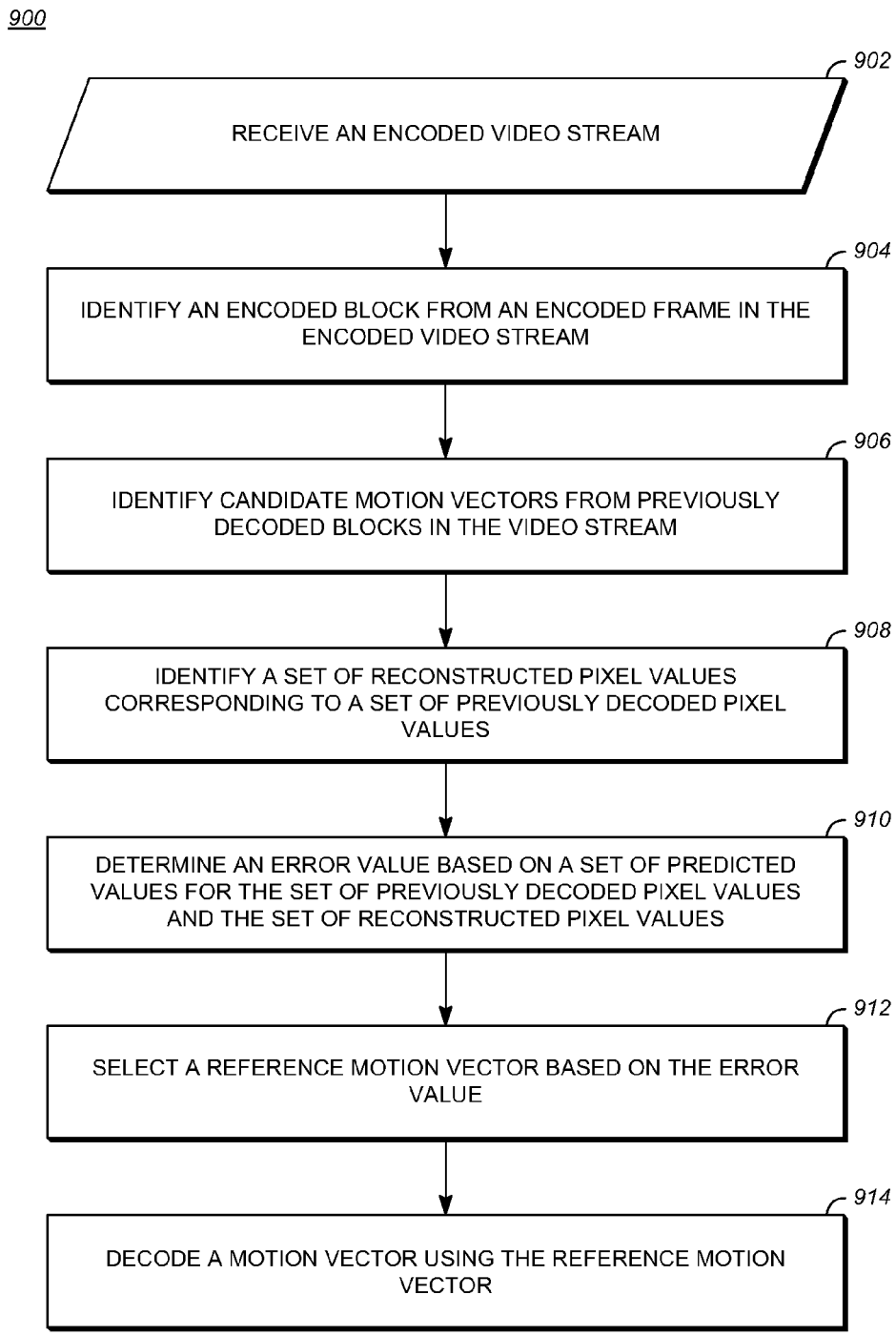
FIG. 9 is a flow diagram of an example method of operation for decoding a video stream using reference motion vectors in accordance with implementations of this disclosure.

FIG. 9 is a flowchart of an example method of operation 900 for decoding an encoded video stream using reference motion vectors in accordance with implementations of this disclosure. Method of operation 900 can be implemented, for example, as a software program that may be executed by computing devices such as transmitting station 102 or receiving station 110. For example, the software program can include machine-readable instructions that may be stored in a memory such as memory 106 or 114, and that, when executed by a processor, such as CPU 104 or 112, may cause the computing device to perform method of operation 900. Method of operation 900 can be implemented using specialized hardware or firmware. As explained above, some computing devices may have multiple memories or processors, and the steps of method of operation 900 can be distributed using multiple processors, memories, or both.

Implementations of decoding the encoded video stream can include, for example, receiving encoded video stream at a step 902, identifying an encoded block from an encoded frame at a step 904, identifying candidate motion vectors from previously decoded blocks in the video stream at a step 906, identifying a set of reconstructed pixel values corresponding to a set of previously decoded pixel values at a step 908, determining an error value based on a set of predicted values for the set previously decoded pixel values and the set of reconstructed pixel values at a step 910, selecting a reference motion vector based the error value at a step 912, and decoding a motion vector using the reference motion vector at a step 914.

At step 902, a computing device such as receiving station 110 may receive encoded video stream, such as compressed bitstream 320. The encoded video stream (which may be referred to herein as the encoded video data) can be received in any number of ways, such as by receiving the video data over a network, over a cable, or by reading the video data from a primary memory or other storage device, including a disk drive or removable media such as a DVD, Compact-Flash (CF) card, Secure Digital (SD) card, or any other device capable of communicating a video stream.

At step 904, an encoded block can be identified from an encoded frame in the encoded video stream. The encoded block can be, for example, a block that has been encoded at encoder 300 using any of the prediction techniques described herein, such as vertical prediction mode or horizontal prediction mode. The encoded block can be referred to as the current block.

At step 906, multiple candidate motion vectors can be identified from previously decoded blocks in the video stream. The previously decoded blocks can include any block decoded prior to the current block, such as a previously decoded block from the same frame as the current block, or any block from any previously decoded frame. For example, in codec schemes that use raster scanned coding, previously decoded blocks can include a block above the current block in the same frame, a block to the left of the current block in the current frame, a block to the above-left of the current block in the current frame, a block from a reference frame (such as a block from the last frame at the same location as the current block or a block from the golden frame), or any combination thereof. The motion vectors from previously decoded blocks can be identified as candidate motion vectors for the current block.

At step 908, a set of reconstructed pixel values corresponding to a set of previously decoded pixel values can be identified. In some implementations, the set of previously decoded pixel values can include one or more rows of pixel values above the current block, or one or more columns of pixel values to the left of the current block, or both. In the examples described in FIGS. 6-8, the set of previously decoded pixel values includes data in the two rows immediately above the current block and data in the two columns immediately to the left of the current block. In other implementations, data from rows or columns not immediately adjacent to the current block, including data from blocks that are not adjacent to the current block, can be included in the set of previously decoded pixel values.

At step 910, an error value can be determined for at least one of the candidate motion vectors based on the set of reconstructed pixel values and a set of predicted values for the set of previously decoded pixel values. The (at least one) candidate motion vector can be applied to the set of previously decoded pixel values to determine the set of predicted values from a reference frame. Then, the set of predicted pixel values can be compared against the set of reconstructed pixel values from step 908 to determine the error value (i.e., match score) for that candidate motion vector. Step 910 can be implemented, for example, at intra/inter prediction stage 406 of decoder 400 in FIG. 4.

In some implementations, step 910 determines, for each candidate motion vector, a corresponding set of predicted values for the set of previously decoded pixel values based on the candidate motion vector. Then, for each candidate motion vector, an error value can be determined based on a difference between the set of predicted values and the set of reconstructed pixel values.

The match scores can be determined using metrics such as sum of absolute difference (SAD), sum of squared error (SSE), mean squared error (MSE), or any other error metric. In some implementations, different weights can be associated with pixels in the set of previously decoded pixel values when determining the match scores. For example, more weight can be given to the row or column of pixels immediately adjacent to the current block and less weight can be given to the row or column of pixels further away from the current block.

At step 912, a reference motion vector can be selected for the current block from the candidate motion vectors. The selection can be based on, for example, selecting the candidate motion vector associated with the best match score, such as the candidate motion vector with the lowest error value among all the candidate motion vectors.

At step 914, a motion vector can be decoded for the current block using the reference motion vector selected at step 912.

In some implementations, the reference motion vector can be used to differentially decode the motion vector for the current block. For example, a difference value can be decoded for the current block, which can be added to the reference motion vector selected at step 912 to determine the motion vector.

In some other implementations, the reference motion vector can be used to identify a probability distribution, which can be used to decode a magnitude value of the motion vector for the current block.

In some other implementations, the reference motion vector can be used as the motion vector for the current block. When the difference between the reference motion vector and the motion vector is small (or zero), difference in prediction results between using the reference motion vector and the motion vector is also small (or zero). For example, the motion vector may not have been encoded, and the reference motion vector may be used by the decoder 400 as the motion vector for the current block.

The encoded current block can be entropy decoded at entropy decoding stage 402, dequantized at dequantization stage 404, and inverse transformed at inverse transform stage 408 to determine a derived residual. The derived residual can be added to the predicted values using the motion vector decoded or otherwise determined for the current block to reconstruct the current block at reconstruction stage 410. A frame can be reconstructed from the blocks derived from the reconstructed residual and the predicted values by intra or inter prediction, or both. The output can be an output video stream, such as the output video stream 416 shown in FIG. 4, and may be referred to as a decoded video stream.

Method of operation 900 is depicted and described as a series of steps. However, steps in accordance with this disclosure can occur in various orders or concurrently. For example, the set of previously coded pixel values in step 908 can be identified before or concurrently with the candidate motion vectors in step 906. Additionally, steps in accordance with this disclosure may occur with other steps not presented and described herein. Furthermore, not all illustrated steps may be required to implement a method in accordance with the disclosed subject matter.

For example, the motion vector for the current block may not be decoded.

The implementations of encoding and decoding described above illustrate some exemplary encoding and decoding techniques. However, "encoding" and "decoding", as those terms are used herein, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such.

A computing device implementing the techniques disclosed herein (and the algorithms, methods, instructions, etc. stored thereon and/or executed thereby) can be realized in hardware, software, or any combination thereof including, for example, IP cores, ASICS, programmable logic arrays, optical processors, programmable logic controllers, microcode, microcontrollers, servers, microprocessors, digital signal processors or any other suitable circuit or other information processing device, now existing or hereafter developed. In the claims, the term "processor" should be understood as encompassing any of the foregoing hardware, either singly or in combination. The terms "signal" and "data" are used interchangeably.

Further, in some implementations, for example, the techniques described herein can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

In some implementations, transmitting station 102 and receiving station 110 can, for example, be implemented on computers in a screencasting system. Alternatively, transmitting station 102 can be implemented on a server and receiving station 110 or 40 can be implemented on a device separate from the server, such as a hand-held communications device (i.e. a cell phone). In this instance, transmitting station 102 can encode content using an encoder 300 into an encoded video signal and transmit the encoded video signal to the communications device. In turn, the communications device can then decode the encoded video signal using a decoder 400. Alternatively, the communications device can decode content stored locally on the communications device, i.e. content that was not transmitted by transmitting station 102. Other suitable transmitting station 102 and receiving station 110 implementation schemes are available. For example, receiving station 110 can be a generally stationary personal computer rather than a portable communications device and/or a device including an encoder 300 may also include a decoder 400.

Further, all or a portion of implementations of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Other embodiments or implementations may be within the scope of the following claims.

What is claimed is:

1. A method for encoding a current block of a video stream having a plurality of blocks including the current block, comprising:

identifying, from a plurality of blocks coded before the current block, a plurality of candidate motion vectors, each candidate motion vector associated with a respective reference frame;

identifying, for the current block of a current frame, a set of reconstructed pixel values for a set of pixel positions within the current frame, but outside of the current block, coded before the current block;

for each candidate motion vector of the plurality of candidate motion vectors:

generating, by applying the candidate motion vector to the set of pixel positions, a set of predicted pixels for the reconstructed pixels within the respective reference frame associated with the candidate motion vector; and determining an error value between the set of reconstructed pixel values and values of the set of predicted pixels; and selecting, from the plurality of candidate motion vectors, a reference motion vector for the current block based on the error value for each candidate motion vector.

2. The method of claim 1, wherein the set of pixel positions includes at least one of: one or more rows of pixels above the current block or one or more columns of pixels to the left of the current block.

3. The method of claim 1, wherein the error value is determined using one of the following metrics: sum of absolute difference (SAD), sum of squared error (SSE) or mean squared error (MSE).

4. The method of claim 1, wherein the reference motion vector is selected from the plurality of candidate motion vectors as the candidate motion vector associated with the lowest error value.

5. The method of claim 1, further comprising:
encoding, for the current block, a motion vector using the reference motion vector.

6. The method of claim 5, wherein encoding, for the current block, the motion vector using the reference motion vector includes encoding, for the current block, a difference value based on the reference motion vector and the motion vector for the current block.

7. The method of claim 5, wherein encoding, for the current block, the motion vector using the reference motion vector includes:
identifying a probability distribution based on the reference motion vector; and
encoding a magnitude value of the motion vector for the current block based on the probability distribution.

8. The method of claim 1, wherein the reference motion vector is selected as a motion vector for the current block.

9. A method for decoding a current block of an encoded video stream having a plurality of blocks including the current block, comprising:
identifying, from a plurality of blocks decoded before the current block, a plurality of candidate motion vectors, each candidate motion vector associated with a respective reference frame;
identifying, for the current block of a current frame, a set of reconstructed pixel values corresponding to a set of pixel positions within the current frame, but outside of the current block, decoded before the current block;
for each candidate motion vector of the plurality of candidate motion vectors:
generating, by applying the candidate motion vector to the set of pixel positions, a set of predicted pixels within the respective reference frame associated with the candidate motion vector; and
determining an error value between the set of reconstructed pixel values and values of the set of predicted pixels; and
selecting, from the plurality of candidate motion vectors, a reference motion vector for the current block based on the error value for each candidate motion vector.

10. The method of claim 9, wherein the set of pixel positions includes at least one of: one or more rows of pixels above the current block or one or more columns of pixels to the left of the current block.

11. The method of claim 9, wherein the error value is determined using one of the following metrics: sum of absolute difference (SAD), sum of squared error (SSE) or mean squared error (MSE).

12. The method of claim 9, wherein the reference motion vector is selected from the plurality of candidate motion vectors as the candidate motion vector associated with the lowest error value.

13. The method of claim 9, further comprising:
decoding, for the current block, a motion vector using the reference motion vector.

14. The method of claim 13, wherein decoding, for the current block, the motion vector using the reference motion vector includes
decoding, from the current block, a difference value based on the reference motion vector and the motion vector for the current block; and
determining the motion vector for the current block based on a sum of the difference value and the reference motion vector.

15. The method of claim 13, wherein decoding, for the current block, the motion vector using the reference motion vector includes:
identifying a probability distribution based on the reference motion vector; and
decoding a magnitude value of the motion vector for the current block based on the probability distribution.

16. The method of claim 9, wherein the reference motion vector is selected as a motion vector for the current block.

17. An apparatus for encoding a current block of a video stream having a plurality of blocks including the current block, comprising:
a memory;
a processor configured to execute instructions stored in the memory to:
identify, from a plurality of blocks coded before the current block, a plurality of candidate motion vectors, each candidate motion vector associated with a respective reference frame;
identify, for the current block of a current frame, a set of reconstructed pixel values for a set of pixel positions within the current frame, but outside of the current block, coded before the current block;
for each candidate motion vector of the plurality of candidate motion vectors:
generate, by applying the candidate motion vector to the set of pixel positions, a set of predicted pixels within the respective reference frame associated with the candidate motion vector; and
determine an error value between the set of reconstructed pixel values and values of the set of predicted pixels; and
select, from the plurality of candidate motion vectors, a reference motion vector for the current block based on the error value for each candidate motion vector.

18. The apparatus in claim 17, wherein the processor is further configured to execute instructions to:
encode, for the current block, a motion vector using the reference motion vector.

* * * * *